United States Patent
Boe

[19]

[11] Patent Number: 5,987,706
[45] Date of Patent: Nov. 23, 1999

[54] DEVICE FOR REMOVABLY COUPLING A PLURALITY OF STRUCTURES

[75] Inventor: Craig L. Boe, Nampa, Id.

[73] Assignee: Micron Electronics, Inc., Nampa, Id.

[21] Appl. No.: 08/965,629

[22] Filed: Nov. 6, 1997

[51] Int. Cl.[6] ............................................. B65D 63/00
[52] U.S. Cl. ........................... 24/16 PB; 24/442; 24/577
[58] Field of Search ........................... 24/16 PB, 16 R, 24/17 AP, 17 A, 30.5 P, 306, 442, 450, 452, 575, 576, 577; 248/68.1

[56] References Cited

U.S. PATENT DOCUMENTS

| | | | |
|---|---|---|---|
| 3,000,384 | 9/1961 | Piers, Jr. | 24/17 AP |
| 3,050,578 | 8/1962 | Huebner | 24/17 AP |
| 3,072,986 | 1/1963 | Lefnaer | 24/16 PB |
| 3,266,113 | 8/1966 | Flanagan, Jr. | 24/452 |
| 3,312,583 | 4/1967 | Rochlis | 24/442 X |
| 3,408,705 | 11/1968 | Kayser et al. | 24/452 |
| 3,438,095 | 4/1969 | Evans | 24/16 PB |
| 3,501,814 | 3/1970 | Anderson et al. | 24/16 PB |
| 3,530,543 | 9/1970 | Desmarais et al. | 24/16 PB |
| 3,604,145 | 9/1971 | Zimmerman | 24/16 PB X |
| 3,654,049 | 4/1972 | Ausnit | 24/16 PB |
| 3,869,764 | 5/1975 | Tanaka et al. | 24/577 |
| 3,955,246 | 5/1976 | Tanaka | 24/16 PB X |
| 3,983,603 | 10/1976 | Joyce | 24/16 PB |
| 4,183,121 | 1/1980 | Cousins | 24/577 |
| 4,870,721 | 10/1989 | Cohen | 24/16 PB |
| 4,920,235 | 4/1990 | Yamaguchi | 24/442 X |
| 5,212,853 | 5/1993 | Kaneko | 24/452 |
| 5,479,741 | 1/1996 | Underwood | 24/20 EE X |
| 5,619,909 | 4/1997 | Volk | 24/16 PB X |
| 5,640,744 | 6/1977 | Allen | 24/442 |

FOREIGN PATENT DOCUMENTS

| | | | |
|---|---|---|---|
| 867116 | 5/1961 | United Kingdom | 24/16 PB |

*Primary Examiner*—James R. Brittain
*Assistant Examiner*—Robert J. Sandy
*Attorney, Agent, or Firm*—Perkins Cole, LLP

[57] ABSTRACT

An apparatus for coupling at least two structures. The apparatus comprises a resilient, elongated coupling member having a plurality of spaced-apart apertures and a plurality of projections positioned between respective pairs of adjacent apertures. The apertures in a first portion of the coupling member are sized and positioned to removably receive the projections of a second portion of the coupling member when the coupling member is wrapped around a bundle or structure.

39 Claims, 6 Drawing Sheets

DEVICE FOR REMOVABLY COUPLING A PLURALITY OF STRUCTURES

TECHNICAL FIELD

The present invention is directed toward a device for removably coupling a plurality of structures, the device having projections in one portion thereof positioned to engage corresponding apertures of another portion thereof.

BACKGROUND OF THE INVENTION

Complex electrical and electronic devices may have a large number of cables or wires routed between the various components, connectors, and terminals comprising each device. The cables may become damaged by contacting sharp edges or hot surfaces of components within the device if the cables are not tied down or restrained in some manner. In addition, if not bundled, the cables may become tangled and difficult to trace during diagnostic testing or when the cables must be repaired or replaced.

One approach to solving the foregoing problems has been to bundle the cables together with cable ties. A conventional cable tie may comprise a thin, flat band having an aperture positioned at one end and a tapered tab portion positioned at the opposite end. In operation, the tab portion of the band is inserted into the aperture to form a loop around the cables and the tab portion is drawn through the aperture to tighten the band around the cables. A small plastic or metal engaging member positioned in the aperture engages the portion of the band which passes therethrough and prevents it from loosening. Excess band material projecting from the aperture may then be trimmed off.

One drawback associated with the foregoing approach is that trimming the band requires an extra time-consuming operation. Furthermore, the material comprising the band is typically resilient and accordingly the band must be trimmed with a sharp tool. When trimming the band, the user may inadvertently damage the cables with the tool. In addition, the trimmed edge of the band may be sharp and may accordingly harm the user accessing the internal components of the electronic device. Conversely, if the excess portion of the band is not trimmed, it may obstruct visual and physical access to the internal components of the device, or may interfere with normal operation of the components.

Still a further drawback with the foregoing approach is that once installed, the cable tie cannot easily be removed because the engaging member is deliberately positioned to prevent the cable tie from loosening. As a result, the user may be required to cut the cable tie band with a sharp tool to access individual cables, and may inadvertently damage the cables when doing so. Furthermore, the band is not reusable once cut, and must therefore be replaced. Accordingly, the entire operation may become time-consuming, may incur additional material costs in the form of replacement cable ties, and may increase the likelihood that the cables will be damaged whenever the cable ties are removed or installed.

SUMMARY OF THE INVENTION

The present invention is a device for coupling at least two structures, such as wires or cables. A device in accordance with one embodiment of the invention comprises a flexible, elongated coupling member having a plurality of spaced-apart apertures therein. The coupling member also has a plurality of projections positioned between the apertures. The apertures formed in a first portion of the coupling member are sized and positioned to removably receive the projections formed on a second portion of the coupling member when the coupling member is wrapped around the structures.

In one embodiment, the coupling member has a first surface and a second surface facing opposite the first surface and the apertures extend through the coupling member from the first surface to the second surface. In another embodiment, the apertures extend partially through the coupling member from the first surface.

In one embodiment, the coupling member is formed from a material that is elastically deformable in a direction generally transverse to the longitudinal axis of the coupling member. In another embodiment, the coupling member is formed from a material that is elastically deformable in a direction generally aligned with the longitudinal axis of the coupling member. In still another embodiment, the coupling member has aperture walls defining each aperture. The aperture walls are bendable relative to each other to extend the coupling member between a first position and a second position, the coupling member having a greater length when in the second position than when in the first position. The apertures are accordingly sized and positioned to removably receive the projections of the second portion of the coupling member when the coupling member is in the second position.

DETAILED DESCRIPTION OF THE INVENTION

The present invention is directed toward a device for removably coupling structures together. The device may be used to bundle electrical cables, couple a conduit to a support structure, or couple any of a myriad of other structures. FIGS. 1–9 illustrate various embodiments of the apparatus, and like reference numbers refer to like parts throughout the figures.

Figure 1:
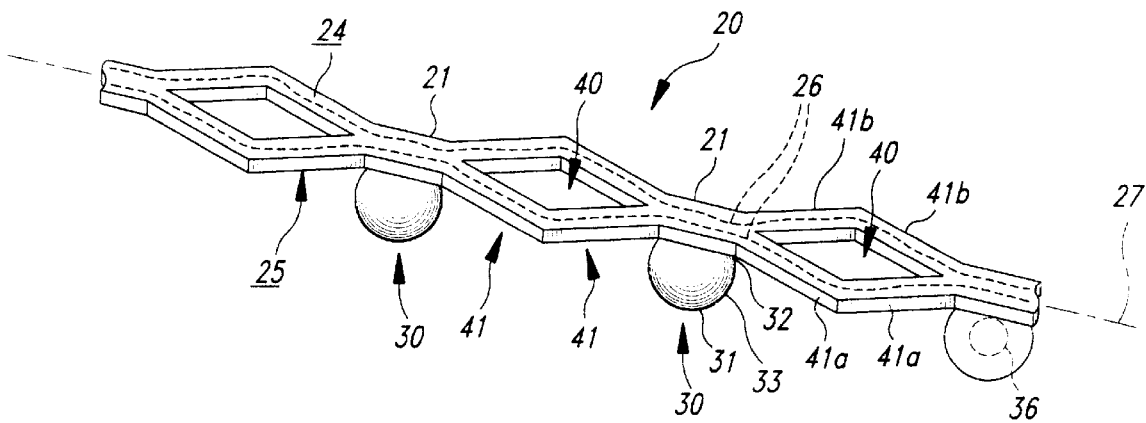
FIG. 1 is a top isometric view of a portion of a device in accordance with an embodiment of the invention.

FIG. 1 is a top isometric view of a portion of a coupling member or band 20 in accordance with an embodiment of the invention. The coupling member 20 has an upper surface 24 and a lower surface 25 facing opposite the upper surface. A plurality of spaced-apart apertures 40 extend through the coupling member 20 from the upper surface 24 to the lower surface 25. Connecting portions 21 are positioned at opposite ends of each aperture 40. Projections 30 depend from the connecting portions 21 and extend away from the lower surface 25. The projections 30 of one portion of the coupling member 20 may be interlocked with the apertures 40 of another portion of the coupling member to form a loop which may be positioned to couple together wires, cables, or other structures.

In one embodiment, the coupling member 20 is elongated along a longitudinal axis 27 and comprises a flexible, resilient material. The material may be sufficiently flexible perpendicular to the longitudinal axis 27 so that one portion of the coupling member 20 may be folded to overlap and couple with another portion of the coupling member, as will be discussed in greater detail below with reference to FIGS. 2A–2D. In one embodiment, the coupling member 20 and connecting portions 21 thereof comprise a rubber, plastic, nylon or other elastically deformable material. Accordingly, the coupling member 20 may be stretched along the longitudinal axis 27 and will tend to return to its unstretched position. The coupling member 20 may further include fiber reinforcements 26 which are generally aligned with the longitudinal axis 27 and which may prevent the coupling member from stretching beyond a selected point, such as the elastic limit of the material comprising the coupling member. The fiber reinforcements 26 may also increase the overall strength of the coupling member 20.

In one embodiment, the apertures 40 formed in the coupling member 20 are defined by aperture walls 41 which are formed integrally with the connecting portions 21. The aperture walls 41 may accordingly comprise a resilient, flexible material, substantially as discussed above with reference to the coupling member 20 generally, and may also include fiber reinforcements 26 to resist overstretching. The aperture walls 41 may extend at least partially outwardly transverse to the longitudinal axis 27 when the coupling member 20 is in the unstretched position, as shown in FIG. 1. Accordingly, when the coupling member 20 is stretched along the longitudinal axis 27, aperture walls 41a and 41b positioned on opposite sides of each aperture 40 tend to draw inwardly toward each other to engage a corresponding projection 30, as will be discussed in greater detail below. In one embodiment, the aperture walls 41 define a generally diamond-shaped aperture 40. In other embodiments, the aperture walls 41 define apertures 40 having other shapes, as will be discussed below with reference to FIGS. 4 and 5.

The projections 30 are positioned between the apertures 40 as shown in FIG. 1. The projections 30 have a generally spherical shape in the embodiment shown in FIG. 1, and may have other shapes in other embodiments, as will be discussed below with reference to FIGS. 7 and 8. Each projection 30 has a base region 32 adjacent the connecting portion 21, an end region 31 spaced apart from the connecting portion, and an intermediate region 33 between the base region and the end region. The end region 31 is tapered and narrows as the projection 30 extends away from the connecting portion 21.

Accordingly, each projection 30 may be more easily inserted into a corresponding aperture 40. The intermediate region 33 bulges outwardly relative to the base region 32 so that when the projection 30 is fully inserted into the aperture 40 and the aperture walls 41 engage the base region, the projection 30 will resist being inadvertently pulled out of the corresponding aperture 40. In one embodiment, each projection 30 may comprise a flexible material which compresses or otherwise deforms when the projection is inserted into an aperture 40. In another embodiment, the projection 30 may have a void or hollow portion 36 therein so that it may be easily compressed. In yet another embodiment, the projection 30 may be substantially rigid and the corresponding aperture walls 41 may flex or deform when the projection is inserted therein.

Figure 2A:
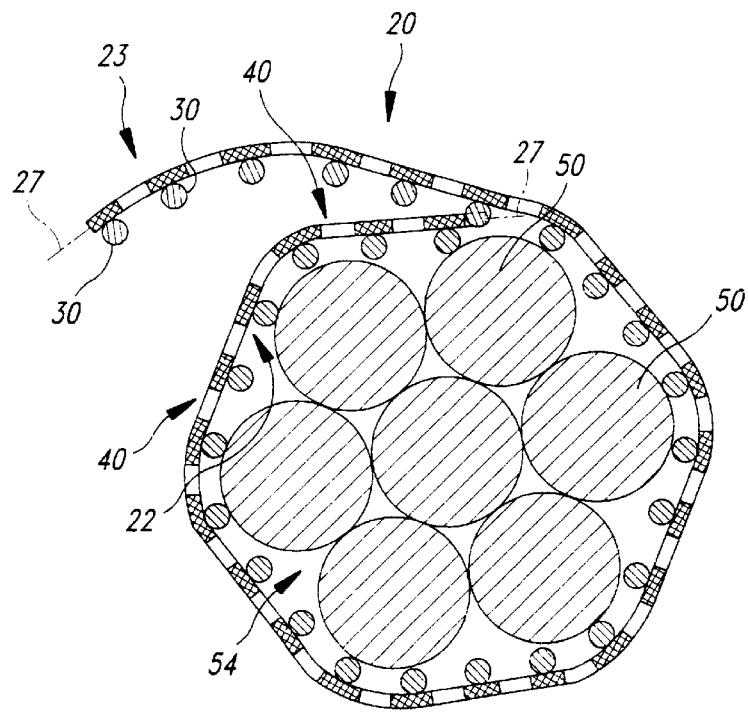
FIG. 2A is a cross-sectional view of the device of FIG. 1 shown in position to clamp a plurality of cables.
Figure 2B:
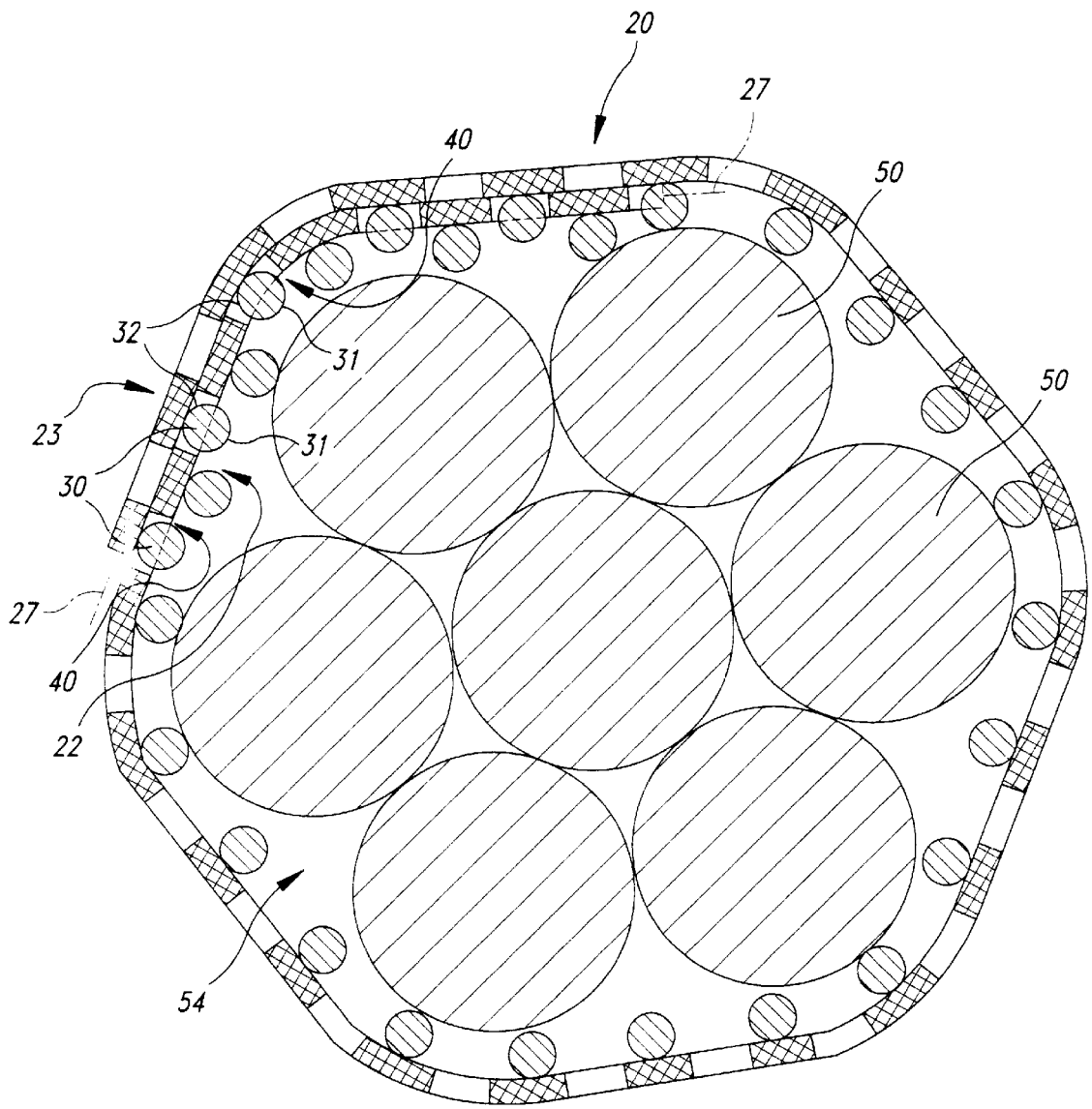
FIG. 2B is a cross-sectional view of the device of FIG. 2A shown clamping the plurality of cables.

Operation of an embodiment of the coupling member 20 is best understood with reference to FIGS. 1 and 2A–2B. FIG. 2A is a cross-sectional view of a coupling member 20 positioned around a plurality of cables 50 which form a cable bundle 54. As shown in FIG. 2A, the length of the coupling member 20 along the longitudinal axis 27 is greater than the circumference of the bundle 54, so that when it is wrapped around the bundle, the coupling member has an overlapping portion 23 positioned over an underlying portion 22. The coupling member 20 may be stretched as it is wrapped around the bundle 54 so that selected projections 30 of the overlapping portion 23 are aligned with selected apertures 40 of the underlying portion 22.

Once the projections 30 and apertures 40 are aligned, the projections may be inserted into the apertures 40, as shown in cross-sectional view in FIG. 2B. At this point, the apertures 40 may be slightly smaller than the projections 30 so that the projections engage the aperture walls 41 as the projections are inserted into the apertures. As the projections 30 are inserted into the apertures 40, the aperture walls 41 may expand slightly and/or the projections 30 may compress slightly so that the projections pass through the apertures. In one embodiment, the end regions 31 of the projections 30 project outwardly through the apertures 40 and the aperture walls 41 clamp the projections in the base regions 32 thereof. Because opposing aperture walls 41a and 41b (FIG. 1) tend to move toward each other when the coupling member 20 is stretched, the opposing aperture walls may tend to clamp the corresponding projection 30 therebetween. As discussed above, the intermediate region 33 of the projection 30 may be larger than the base region 32, to resist unintended motion of the projection 30 out of the aperture 40 once it has been inserted therein. If the user intends to remove the coupling member 20, the user may grasp the overlapping portion 23 and unwind it from the bundle 54, pulling the projections 30 out of the corresponding apertures 40.

In one embodiment, the entire overlapping portion 23 engages the underlying portion 22, and all the projections 30 of the overlapping portion are inserted into corresponding apertures 40 of the underlying portion. In a further aspect of this embodiment, the spacing between adjacent apertures 40 and between adjacent projections 30, as well as the elasticity of the coupling member 20 are chosen so that the projections may be easily aligned with the apertures. For example, the spacing between the centers of adjacent apertures 40 can be the same as the spacing between the centers of adjacent projections 30. In a further aspect of this embodiment, the spacing of the projections 30 and apertures 40 and the flexibility of the coupling member 20 may be selected such that the user may engage any one projection with one of several apertures, depending upon how much the user stretches the coupling member. The user may accordingly determine how tightly the coupling member 20 engages the bundle 54 by selecting the appropriate apertures 40 in which to insert the corresponding projections 30.

One advantage of an embodiment of the coupling member 20 shown in FIGS. 1 and 2A–2B is that, when installed, it is possible for the coupling member to have no excess material projecting away from the bundle 54 which it encircles. Accordingly, the coupling member 20 may have no sharp edges which may harm surrounding components of a user accessing the cables 50 or components to which the coupling member is attached. Furthermore, by eliminating excess material, an embodiment of the coupling member 20 may be less likely to obstruct the user's access to the cables 50 or components, and may be less likely to become caught in the components.

A further advantage of the coupling member 20 shown in FIGS. 1 and 2 is that the excess material is eliminated by manually attaching the overlapping portion 23 to the underlying portion 22 without the use of tools. By eliminating the need for tools, the coupling member 20 may reduce the likelihood that the user will harm either the cables 50 or the user when installing or removing the coupling member. Still another advantage of the coupling member 20 is that it need not be destroyed or damaged when it is removed from the cables 50 around which it is positioned. Accordingly, the coupling member 20 may be reused after it has been removed and need not be replaced.

Yet another advantage of the coupling member 20 is that a coupling member having a given length may be used to secure bundles of cables 54 having a wide variety of circumferences. Where the length of the coupling member exceeds the circumference of the bundle, the overlapping portion 23 may be attached to the underlying portion 22. Where the length of the coupling member 20 is less than the circumference of the bundle 54, the coupling member may be stretched along the longitudinal axis 27. Also, several coupling members 20 may be connected in series to surround a bundle 54 having a circumference that is greater than the length of a single coupling member 20. Still a further advantage of an embodiment of the coupling member 20 is that a user may select how tightly the cables 50 are bundled by stretching the coupling member by the desired amount before engaging the projections 30 with the apertures 40.

Figure 2C:
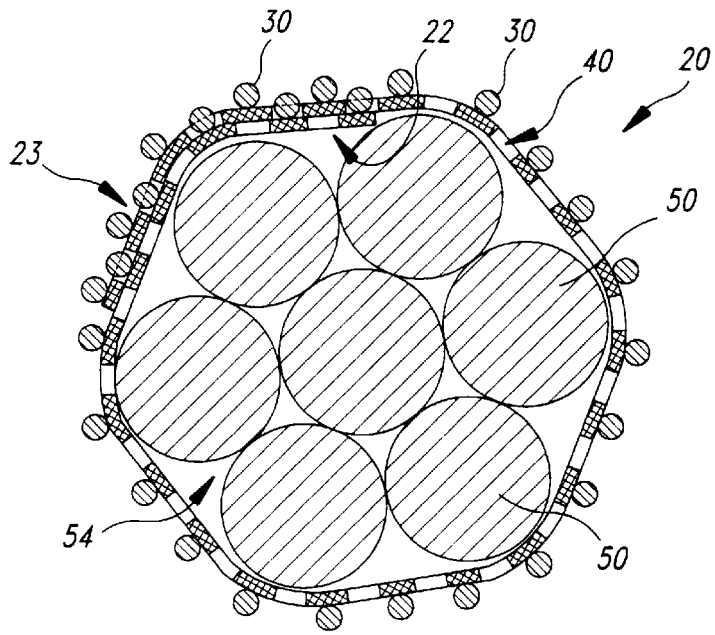
FIG. 2C is a cross-sectional view of the device of FIG. 1 shown encircling a plurality of cables, the device having projections facing outwardly away from the cables.

FIG. 2C is a cross-sectional view of the coupling member 20 of FIG. 1 shown encircling a cable bundle 54 and having the projections 30 thereof facing outwardly away from the cables 50. The coupling member 20 may be positioned as shown in FIG. 2C where it is preferable not to have the projections 30 engaging the cables 50 or other structures coupled by the coupling member 20. Conversely, an advantage of installing the coupling member such that the projections 30 face inwardly toward the cables 50, as shown in FIGS. 2A–2B, is that the projections may have a reduced tendency to catch or snag on neighboring devices or structures.

Figure 2D:
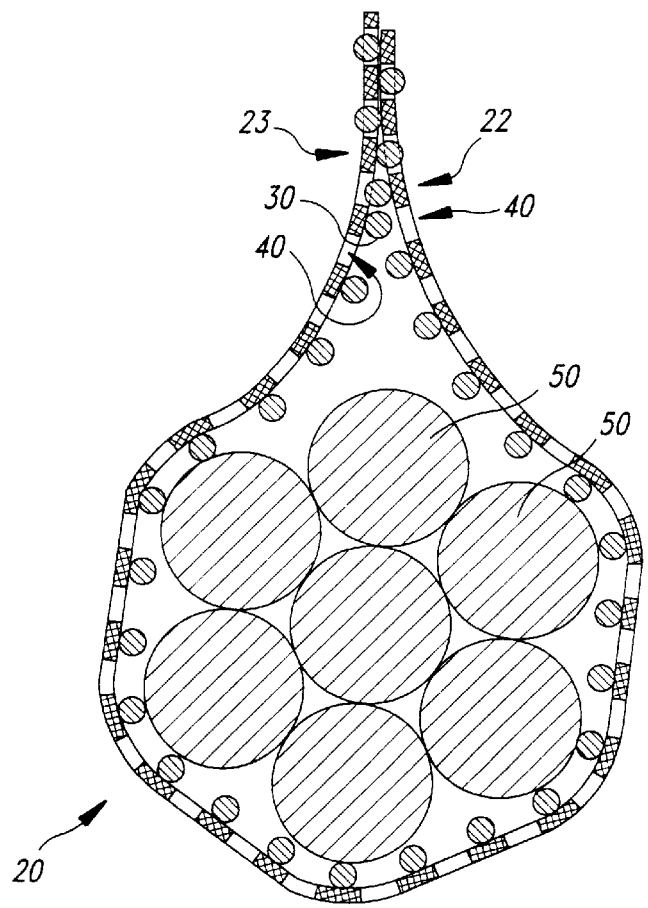
FIG. 2D is a cross-sectional view of the device of FIG. 1 wherein projections and apertures of an underlying portion of the device engage apertures and projections, respectively, of an overlapping portion of the device.

FIG. 2D is a cross-sectional view of the coupling member 20 of FIG. 1 wherein the projections 30 and apertures 40 of the underlying portion 22 engage corresponding apertures and projections, respectively, of the overlapping portion 23. An advantage of the installation arrangement shown in FIG. 2D may be that because the projections 30 of both the overlapping portion 23 and underlying portion 22 engage corresponding apertures 40 in the opposite portion, the bond formed between the overlapping and underlying portions 23 and 22 may be stronger, and the coupling member 20 may be less likely to loosen. Conversely, an advantage of the installation arrangement shown in FIGS. 2A–2B is that the overlapping and underlying portions may be more tightly wrapped around the cables 50 and may therefore be less likely to interfere with surrounding components or obstruct the motion of a user accessing the components.

In the embodiments shown in FIGS. 1 and 2A–2D, the coupling member 20 is stretchable along the longitudinal axis 27 because the connecting portions 21 and/or the aperture walls 41 comprise a flexible material. In addition, the coupling member 20 may be extendible along the longitudinal axis 27 because opposing aperture walls 41a and 41b may be drawn toward each other when the coupling member is stretched along the longitudinal axis, as discussed above. In another embodiment, the aperture walls 41 may be rigid and the flexibility of the coupling member may be provided by the connecting portions 21 alone. The projections 30 may accordingly be flexible so as to be easily inserted into the apertures 40. In another embodiment, the aperture walls 41 may be rigid and may be pivotally or otherwise connected to each other so that they may move relative to each other, allowing the coupling member 20 to elongate along the longitudinal axis 27. In yet another embodiment, the connecting portions 21 may be rigid and the flexibility of the coupling member may be provided by flexible aperture walls 41 or by rigid and pivotally connected aperture walls. In still another embodiment, the coupling member 20 may not be stretchable along the longitudinal axis 27 so long as it is sufficiently flexible to wrap upon itself, as shown in FIG. 2B, and so long as the aperture walls 41 and the projections 30 are positioned to firmly engage each other. In any of the foregoing embodiments, the apertures 40 and projections 30 may be sufficiently small and closely spaced so that the overlapping portion 23 may be easily coupled to the underlying portion 22 over a wide range of bundle circumferences.

As shown in FIGS. 1–2D, a single aperture 40 is positioned between two projections 30 and a single projection is positioned between two apertures. In other embodiments, a greater number of apertures 40 may be positioned between each pair of projections 30, or a greater number of projections may be positioned between each pair of apertures.

As is also shown in FIGS. 1–2D, the coupling member 20 may have projections 30 and apertures 40 which are evenly distributed over the entire length thereof. In another embodiment, one portion of the coupling member 20, such as the overlapping portion 23, may have projections 30 and no apertures 40 and another portion, such as the underlying portion 22, may have apertures and no projections. In another embodiment, the respective positions of the projections 30 and apertures 40 may be reversed. An advantage of either embodiment is that the coupling member 20 may be less costly to manufacture than the coupling member shown in FIGS. 1–2D. Conversely, an advantage of the coupling member 20 shown in FIGS. 1–2D is that by having projections 30 and apertures 40 distributed along the entire length thereof, the coupling member may more easily encircle cable bundles 54 having a wide variety of circumferences.

Figure 3:
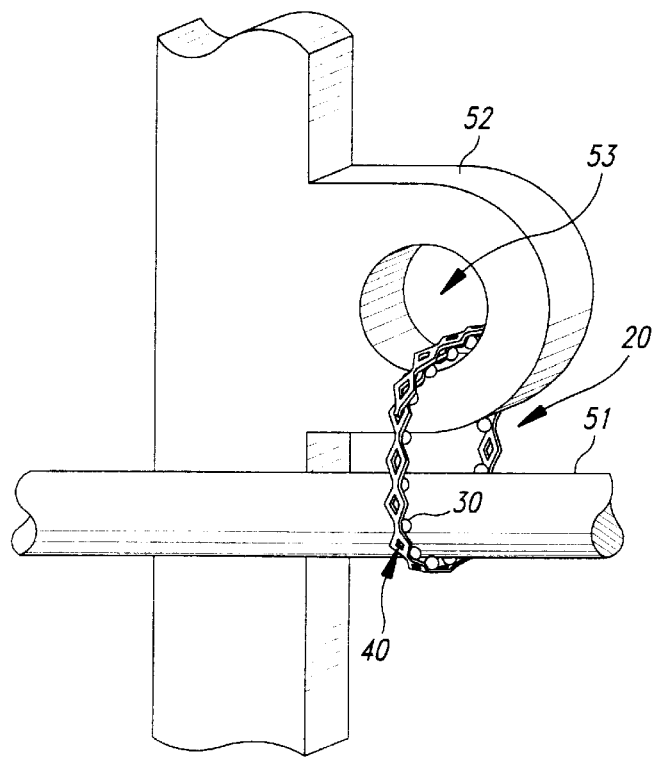
FIG. 3 is a top isometric view of the device of FIG. 1 shown positioned to couple one structure to another.

FIG. 3 is an isometric view of the device of FIG. 1 shown positioned to couple a first structure 51, such as a pipe or conduit, to a second structure 52, such as a support member. Accordingly, the coupling member 20 may be sized to have a strength sufficient to support the structures to which it is attached. In the embodiment shown in FIG. 3, the coupling member 20 may be coupled around the first structure 51 and through an aperture 53 of the second structure 52. In other embodiments, the coupling member 20 may be used to connect any of a myriad of devices or structures together.

An advantage of an embodiment of the coupling member 20 shown in FIG. 3 is that it may be used to quickly attach structures to each other. The structures may be just as quickly detached and, as discussed above, the coupling member 20 may be reused after it has been removed.

Figure 4:
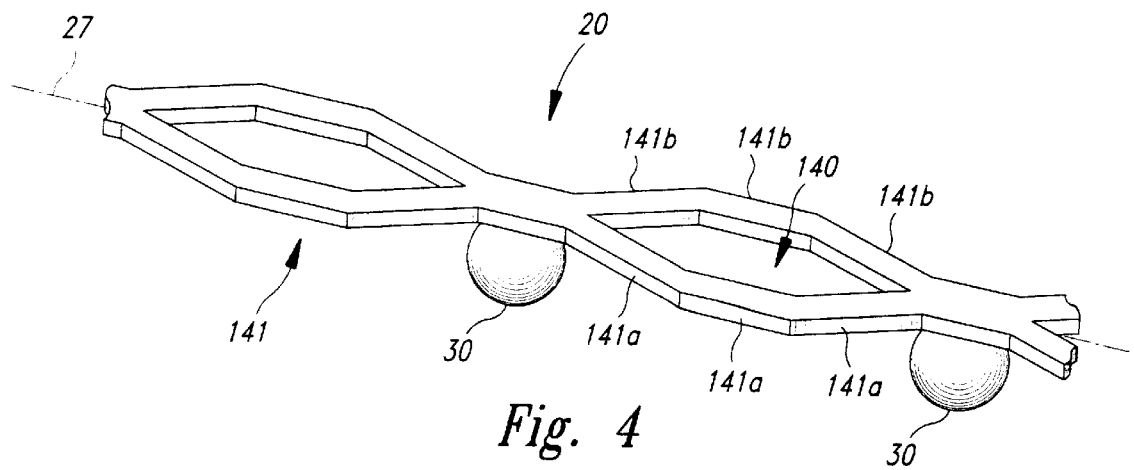
FIG. 4 is a top isometric view of a portion of a device having hexagonal-shaped apertures in accordance with another embodiment of the invention.
Figure 5:
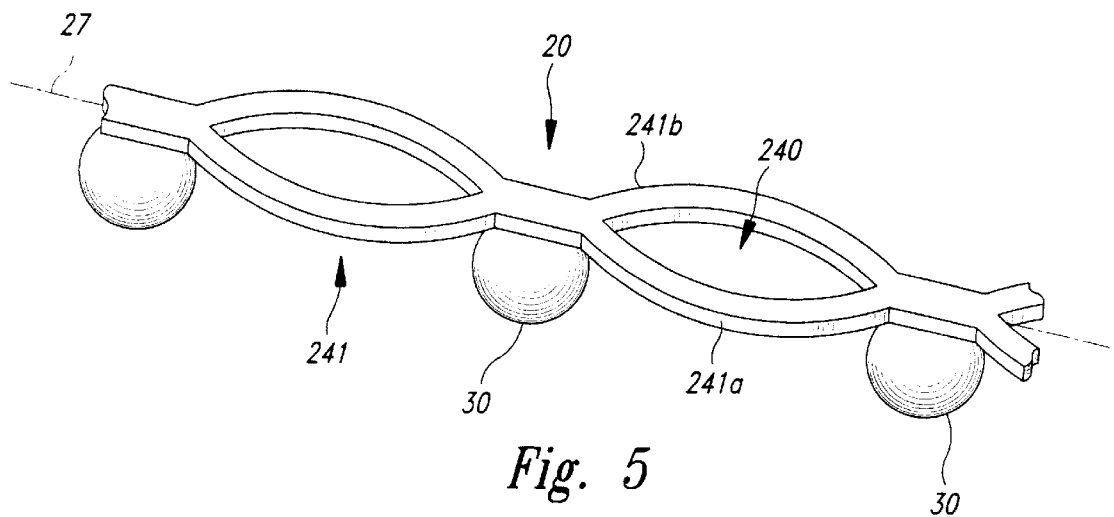
FIG. 5 is a top isometric view of a portion of a device having elliptical apertures in accordance with yet another embodiment of the invention.

FIGS. 4 and 5 are isometric views of portions of coupling members 20 having apertures with shapes other than the diamond shape shown in FIGS. 1–3. The coupling member 20 shown in FIG. 4 has hexagonally-shaped apertures 140, and the coupling member shown in FIG. 5 has elliptically apertures 240. The apertures 140 and 240 are both elongated along the longitudinal axis 27. Opposing aperture walls 141a and 141b shown in FIG. 4 and 241a and 241b shown in FIG. 5 tend to draw toward each other as the coupling member 20 is stretched along the longitudinal axis 27, in a manner substantially as described above with reference to FIGS. 1 and 2A–2B. In other embodiments, the coupling member 20 may have apertures with other shapes, so long as the apertures are sized to receive the projections 30 therein and to resist inadvertent motion of the projections out of the apertures.

Figure 6:
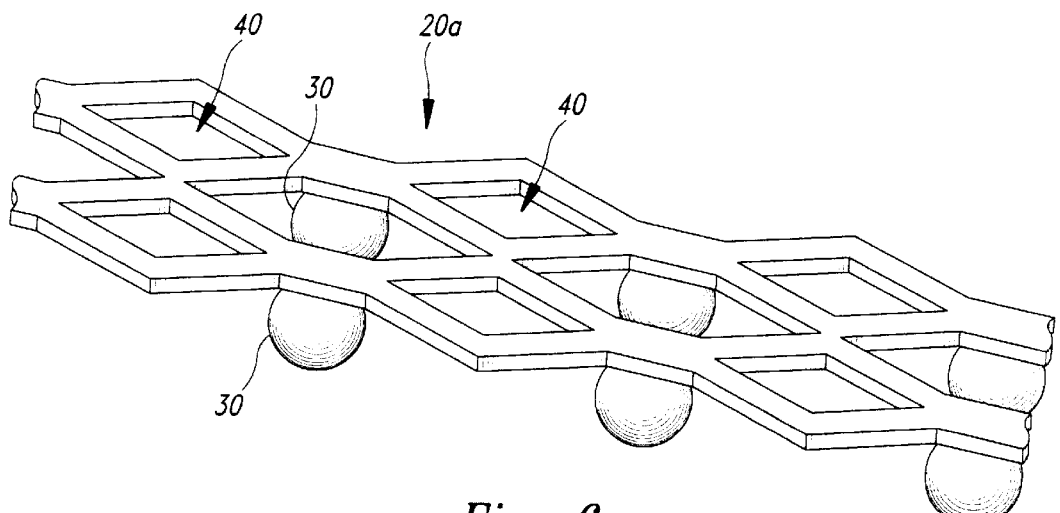
FIG. 6 is a top isometric view of a portion of a device having two parallel rows of apertures and projections in accordance with still another embodiment of the invention.

FIG. 6 is a top isometric view of a portion of coupling member 20a having two parallel rows of apertures 40 and projections 30, in accordance with still another embodiment of the invention. The additional projections 30 and apertures 40 provide additional coupling sites between the overlapping portion 23 and the underlying portion 22 when the coupling member 20a is positioned to bundle cables 50, or couple other structures as discussed above with reference to FIGS. 1–3. In other embodiments, the coupling member 20a may comprise more than two rows of apertures 40 and projections 30. The coupling member 20a may accordingly be provided with a number of parallel rows of apertures 40 and projections 30 which is sufficient to form a strong bond between the overlapping portion 23 and underlying portion 22, without requiring that the user spend an unnecessary amount of time and energy installing and/or removing the coupling member.

Figure 7:
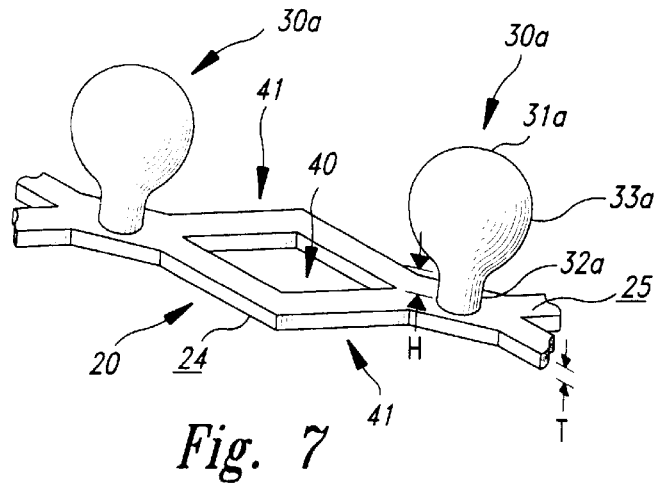
FIG. 7 is a bottom isometric view of portion of a device having bulb-shaped projections in accordance with still another embodiment of the invention.

FIG. 7 is a bottom isometric view of a portion of a coupling member 20 having bulb-shaped projections 30a in accordance with still another embodiment of the invention. As shown in FIG. 7, the base portion 32a of each projection 30a comprises a short cylindrical section which is then coupled to a generally spherical intermediate region 33a and end region 31a. In one embodiment, a height H of the base portion 32a is equal to or greater than a thickness T of the coupling member 20. Accordingly, an advantage of the cylindrical base region 32a when compared with the spherical base region 32 shown in FIG. 1, is that the aperture walls 41 may snap into place around the cylindrical base region when the projection 30a is inserted into the aperture 40. Conversely, an advantage of the spherical base region 32 shown in FIG. 1 is that the sloped surfaces thereof may tend to bias the aperture walls 41 of the aperture 40 into which the projection 30 is inserted toward the lower surface 24 adjacent the projection. Accordingly, the aperture walls 41 may more snugly engage the lower surface 25 of the coupling member 20. Additionally, the spherical projections 30 shown in FIG. 1 may be easier to remove from the apertures 40 when it is desired by the user to do so.

Figure 8:
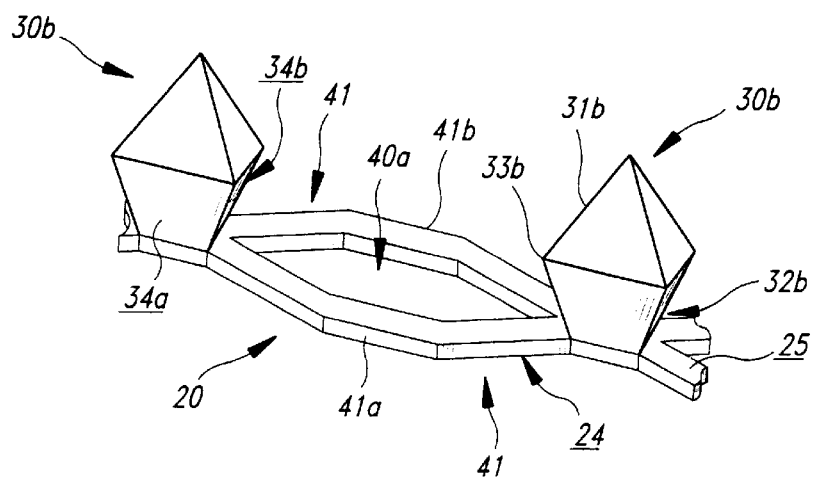
FIG. 8 is a bottom isometric view of a portion of a device having pyramidal-shaped projections in accordance with still another embodiment of the invention.

FIG. 8 is a bottom isometric view of a portion of a coupling member 20 having pyramidally-shaped projections 30b in accordance with still another embodiment of the invention. As shown in FIG. 8, the pyramidal projections 30b each include a base region 32b which is tapered toward the lower surface 25 of the coupling member 20, an intermediate region 33b which is wider than the base region 32b, and an end region 31b which is tapered to be narrower than the intermediate region 33b. Accordingly, the pyramidal projections 30b may be easily inserted into corresponding apertures 40a and may be engaged and locked in place by the aperture walls 41. An advantage of the pyramidal-shaped projections 30b is that the flat sidewalls of the base region 32 may be easily engaged by the flat aperture walls 41. In one embodiment, wherein the coupling member 20 has hexagonally-shaped apertures 40a, opposite flat sidewalls 34a and 34b of the base region 32b may be aligned with aperture walls 41a and 41b of the aperture 40 into which the projection 30b is inserted. Accordingly, the pyramidal projections 30b may be firmly engaged by hexagonal-shaped apertures 40a.

Figure 9:
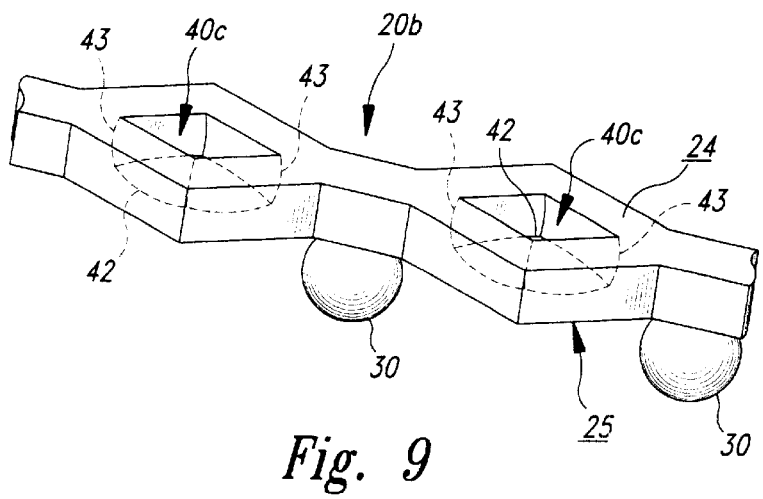
FIG. 9 is a top isometric view of a portion of a device having blind apertures therein in accordance with still another embodiment of the invention.

FIG. 9 is a top isometric view of a coupling member 20b having blind apertures 40c therein in accordance with still another embodiment of the invention. As shown in FIG. 9, the apertures 40c extend from the upper surface 24 of the coupling member 20b into the coupling member and terminate in an end wall 42 which is spaced apart from the lower surface 25. The projections 30 may be inserted into the apertures 40c, substantially as discussed above but will not extend completely through the coupling member 20 as do the projections shown in FIGS. 1–8. In one embodiment, each aperture 40c may have curved interior walls 43, shaped to engage the curved surfaces of the projection 30. Where the projection 30 has another exterior shape, the aperture 40c may have correspondingly-shaped interior walls 43.

An advantage of the coupling member 20b shown in FIG. 9 is that the projections 30 do not project through the apertures 40 when the coupling member is installed. Accordingly, the coupling member 20b may be wrapped upon itself several times, forming a plurality of overlapping and underlying portions. By wrapping the coupling member 20b upon itself several times, a greater number of projections 40 may be engaged with corresponding apertures 30, which may reduce the likelihood that the coupling member will inadvertently uncouple. Conversely, an advantage of the coupling member 20 shown in FIG. 1 is that it is not as thick as the coupling member 20b shown in FIG. 9 and may accordingly be more flexible and require fewer materials to fabricate.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A connection device, comprising a band elongated along a longitudinal axis and being elastically stretchable in direction generally aligned with the longitudinal axis between an unstretched position and a stretched position, the band having a plurality of projections extending from a first surface of the band, the band further having a plurality of apertures extending therethrough, at least one of the apertures being between the projections and extending from a second surface of the band toward the first surface of the band, apertures of a first portion of the band being dimensioned to receive projections of a second portion of the band, at least one of the apertures being defined by opposing aperture walls portions, the walls being movable toward and away from each other in a direction generally transverse to the longitudinal axis between a first position when the band is in the unstretched position and a second position with the walls biased against opposing walls of a corresponding projection when the band is in the stretched position, the band being sufficiently flexible to be folded upon itself with the first portion proximate to the second portion.

2. The connection device of claim 1 wherein the apertures extend through the band from the first surface to the second surface thereof.

3. The connection device of claim 1 wherein the first and second portions of the band are at least partially coextensive with each other.

4. The connection device of claim 1 wherein at least some of the projections are positioned midway between respective pairs of the apertures that are adjacent each other.

5. The connection device of claim 1 wherein the band is resilient in at least one dimension.

6. The connection device of claim 1 wherein the projections are formed from a resilient material.

7. The device of claim 1 wherein at least one projection is positioned midway between two of the apertures.

8. The device of claim 1 wherein each aperture is defined by a set of four aperture walls and has a diamond shape.

9. The device of claim 1 wherein the walls of each aperture defined a generally elliptical shape.

10. The device of claim 1 wherein each aperture is defined by six aperture walls and has a generally hexagonal shape.

11. The device of claim 1 wherein the band includes a plurality of elongated fibers substantially aligned with the longitudinal axis.

12. A device for coupling at least two structures, comprising a generally planar coupling member elongated along a longitudinal axis and elastically stretchable along the longitudinal axis between an unstretched position and a stretched position, the coupling member being bendable in a direction generally perpendicular to the longitudinal axis, the coupling member having a plurality of spaced apart apertures extending therethrough generally in the plane of the coupling member and further having a plurality of projections connected to and extending away therefrom, apertures of a first portion of the coupling member being sized and positioned to removably receive projections of a second portion of the coupling member when the second portion of the coupling member is positioned proximate the first portion of the coupling member, at least one of the apertures being defined by opposing aperture walls the walls being movable toward and away from each other in a direction generally transverse to the longitudinal axis between a first position when the coupling member is in the unstretched position and a second position with the walls biased against opposing walls of a corresponding projection when the coupling member is in the stretched position.

13. The device of claim 12 wherein the coupling member is extendible along the longitudinal axis.

14. The device of claim 12 wherein the coupling member comprises an elastic material which is elastically deformable in a direction generally aligned with the longitudinal axis.

15. The device of claim 12 wherein the coupling member comprises an elastic material which is elastically deformable in a direction generally transverse to the longitudinal axis.

16. The device of claim 12 wherein the coupling member has a first surface and a second surface facing opposite the first surface and the apertures extend through the coupling member from the first surface to the second surface.

17. The device of claim 12 wherein the coupling member has a first surface and a second surface facing opposite the first surface and the apertures extend partially through the coupling member from the first surface.

18. The device of claim 12 wherein the projections comprise a flexible resilient material.

19. The device of claim 12 wherein the coupling member is sized to encircle the two structures.

20. The device of claim 12 wherein at least one of the two structures has a structure aperture therein, the coupling member being sized to extend through the structure aperture.

21. A device for bundling cables, comprising:

a band elongated along a longitudinal axis and being elastic in a direction generally aligned with the longitudinal axis to stretch between an unstretched position and a stretched position, the band having a first surface, a second surface facing opposite the first surface, and a plurality of spaced apart apertures extending therethrough from the first surface to the second surface; and a plurality of projections connected to and extending away from the second surface of the band, the band having a first portion positioned to overlap a second portion when the band engages the cables, the apertures being positioned in the first portion of the band and the projections being positioned on the second portion of the band, the apertures being sized to receive projections on the second portion of the band when the band is stretched along the longitudinal axis from an unstretched position to a stretched position, the apertures being defined by opposing aperture walls, the walls being movable toward and away from each other in a direction generally transverse to the longitudinal axis between a first position when the band is in the unstretched position and a second position with the walls biased against a corresponding projection when the band is in the stretched position.

22. The device of claim 21 wherein at least one projection is positioned between at least some of the apertures.

23. The device of claim 21 wherein at least one projection is positioned adjacent two of the apertures and at least one aperture is positioned adjacent two of the projections.

24. The device of claim 21 wherein the band has a set of aperture walls defining each aperture, at least one of the aperture walls of each set being positioned to engage a portion of one of the projections when the one projection is received by the aperture defined thereby.

25. The device of claim 21 wherein each projection has a first portion spaced apart from the band and a second portion adjacent the band, the first portion of each projection being larger than the second portion of each projection.

26. The device of claim 21 wherein each of the projections has a first portion spaced apart from the band and a second portion adjacent the band, the first portion of each projection being tapered to form a first region and a second region of the first portion of each projection, the first region of the first portion of each projection being narrower and positioned further from the band than the second region of the first portion of each projection.

27. The device of claim 21 wherein each of the projections has a first portion spaced apart from the band and a second portion adjacent the band, the second portion of each projection being tapered to form a first region and a second region, the first region of the second portion of each projection being narrower and positioned closer to the band than the second region of the second portion of each projection.

28. The device of claim 21 wherein each of the projections has a generally spherical shape.

29. The device of claim 21 wherein each of the projections has a rounded external shape.

30. The device of claim 21 wherein each of the projections has a generally rectangular shape when intersected by a plane generally parallel to the first surface of the band.

31. The device of claim 21 wherein the each of the projections has a generally spherical portion spaced apart from the band and a generally cylindrical portion adjacent the band, the spherical portion being larger than the cylindrical portion.

32. The device of claim 21 wherein the apertures are arranged in a plurality of aperture rows generally aligned with the longitudinal axis and the projections are arranged in a plurality of projection rows generally aligned with the longitudinal axis.

33. The device of claim 21 wherein the band has a thickness and each of the projections extends away from the first surface of the band by a distance which exceeds the thickness of the band.

34. An assembly of bundled wires, comprising:

a first elongated wire;

a second elongated wire adjacent to and in contact with the first elongated wire; and a generally planar coupling member elongated along a longitudinal axis and folded upon itself to encircle the first and second wires, projections extending away from a first portion of the coupling member being removably received in apertures of a second portion of the coupling member, the apertures being positioned generally in plane of the coupling member, at least one of the apertures being defined by opposing aperture walls, the walls being movable toward and away from each other in a direction generally transverse to the longitudinal axis between a first position when the coupling member is in the unstretched position and a second position with the walls biased against opposing walls of a corresponding projection when the coupling member is in the stretched position.

35. The assembly of claim 34 wherein the apertures extend through the coupling member from a first surface of the coupling member to a second surface of the coupling member.

36. The assembly of claim 34 wherein the coupling member is extendible along the longitudinal axis.

37. The assembly of claim 34 wherein the coupling member has aperture walls defining each aperture, the aperture walls being flexible in a direction generally aligned with the longitudinal axis.

38. A device for coupling at least two structures, comprising a band having spaced apart apertures extending therethrough, each aperture being formed by walls defining a generally elliptical shape, the band further having a plurality of projections connected to and extending away therefrom, the band having a first portion positioned to engage a second portion when the band couples the two structures, the apertures of the first portion being of a first size when the band is in an extended state and being of a second size when the band is in a retracted state, the first size being smaller than the second size, the projections of the first portion being sized to extend at least partially into the apertures of the second portion when the apertures are of the first size.

39. A device for coupling at least two structures, comprising a band having spaced apart apertures extending therethrough, each aperture being defined by six aperture walls and having a generally hexagonal shape, the band further having a plurality of projections connected to and extending away therefrom, the band having a first portion positioned to engage a second portion when the band couples the two structures, the apertures of the first portion being of a first size when the band is in an extended state and being of a second size when the band is in a retracted state, the first size being smaller than the second size, the projections of the first portion being sized to extend at least partially into the apertures of the second portion when the apertures are of the first size.

* * * * *

UNITED STATES PATENT AND TRADEMARK OFFICE
CERTIFICATE OF CORRECTION

PATENT NO : 5,987,706
DATED : November 23, 1999
INVENTOR(S): Craig L. Boe

It is certified that error appears in the above-identified patent and that said Letters Patent is hereby corrected as shown below:

Claim 1, Line 13

"aperture walls portions, the walls"
    should be
--aperture walls, the walls--

Claim 34, Line 11

"generally in plane of the coupling member,"
    should be
--generally in the plane of the coupling member,__

Signed and Sealed this

Sixteenth Day of January, 2001

Attest:

Q. TODD DICKINSON

Attesting Officer

Commissioner of Patents and Trademarks